(12) United States Patent
Sugiyama et al.

(10) Patent No.: US 8,929,027 B1
(45) Date of Patent: Jan. 6, 2015

(54) MAGNETIC WRITE HEAD WITH TAPERED SIDE GAP FOR REDUCED FAR TRACK INTERFERENCE

(71) Applicant: HGST Netherlands B.V., Amsterdam (NL)

(72) Inventors: Mikito Sugiyama, Odawara (JP); Hiromi Shiina, Hitachi (JP); Kazue Kudo, Odawara (JP); Yasuhiro Wakabayashi, Hiratsuka (JP); Shouji Tokutake, Odawara (JP)

(73) Assignee: HGST Netherlands B.V., Amersterdam (NL)

( * ) Notice: Subject to any disclaimer, the term of this patent is extended or adjusted under 35 U.S.C. 154(b) by 0 days.

(21) Appl. No.: 14/263,895

(22) Filed: Apr. 28, 2014

(51) Int. Cl.
*G11B 5/127* (2006.01)

(52) U.S. Cl.
USPC ............ 360/125.01; 360/125.03; 360/125.14; 360/125.15

(58) Field of Classification Search
USPC ............ 360/125.01–125.03, 125.06, 125.09, 360/125.1, 125.11, 125.13–125.15, 319
See application file for complete search history.

(56) References Cited

U.S. PATENT DOCUMENTS

| | | | |
|---|---|---|---|
| 7,002,775 B2 * | 2/2006 | Hsu et al. | 360/125.03 |
| 7,894,159 B2 * | 2/2011 | Lengsfield et al. | 360/125.03 |
| 8,028,400 B2 | 10/2011 | Bonhote et al. | |
| 8,035,930 B2 | 10/2011 | Takano et al. | |
| 8,120,874 B2 * | 2/2012 | Hsiao et al. | 360/119.04 |
| 8,320,078 B1 | 11/2012 | Zeltser et al. | |
| 8,347,489 B2 | 1/2013 | Hong et al. | |
| 8,355,222 B2 | 1/2013 | Mino et al. | |
| 8,400,731 B1 * | 3/2013 | Li et al. | 360/125.01 |
| 8,547,660 B2 | 10/2013 | Allen et al. | |
| 8,699,183 B2 * | 4/2014 | Sahoo et al. | 360/125.03 |
| 8,792,208 B1 * | 7/2014 | Liu et al. | 360/125.03 |
| 2007/0253107 A1 * | 11/2007 | Mochizuki et al. | 360/126 |
| 2010/0061016 A1 * | 3/2010 | Han et al. | 360/125.3 |
| 2012/0268845 A1 | 10/2012 | Sahoo et al. | |
| 2012/0314325 A1 | 12/2012 | Wessel et al. | |
| 2013/0242431 A1 | 9/2013 | Hosomi et al. | |

OTHER PUBLICATIONS

Maki et al., "Writer Pole Remanence of a Tapered Main Pole Head," Journal of Applied Physics, vol. 107, Issue 3, Feb. 2010, pp. 033910-033910-4, Abstract Only.

* cited by examiner

*Primary Examiner* — Wayne Young
*Assistant Examiner* — Carlos E Garcia
(74) *Attorney, Agent, or Firm* — Zilka-Kotab, PC

(57) ABSTRACT

A magnetic write head for magnetic data recording that has a magnetic write pole and a magnetic side shield structure, wherein the flare angle and bevel angle of the write pole are different from the flare angle and bevel angle of the magnetic side shield structure. The magnetic side shield has a flare angle that is greater than that of the write pole, and has a bevel angle that is smaller than that of the write pole. This advantageously provides a strong write field, while also preventing adjacent track and far track interference. The write head can include a bi-layer non-magnetic side gap structure, wherein one layer of the bi-layer side gap structure has a uniform thickness and the other layer has a non-uniform thickness.

18 Claims, 22 Drawing Sheets

MAGNETIC WRITE HEAD WITH TAPERED SIDE GAP FOR REDUCED FAR TRACK INTERFERENCE

FIELD OF THE INVENTION

The present invention relates to magnetic data recording and more particularly to a magnetic write head having a multi-layer side gap structure that reduces Far Track Interference (FTI) through novel write pole and side shield flare angle and bevel angle.

BACKGROUND

At the heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When current flows through the coil, a resulting magnetic field causes a magnetic flux to flow through the coil, which results in a magnetic write field emitting from the tip of the write pole. This magnetic field is sufficiently strong that it locally magnetizes a portion of the adjacent magnetic media, thereby recording a bit of data. The write field then, travels through a magnetically soft underlayer of the magnetic medium to return to the return pole of the write head.

A magnetoresistive sensor such as a Giant Magnetoresistive (GMR) sensor or a Tunnel Junction Magnetoresistive (TMR) sensor can be employed to read a magnetic signal from the magnetic media. The magnetoresistive sensor has an electrical resistance that changes in response to an external magnetic field. This change in electrical resistance can be detected by processing circuitry in order to read magnetic data from the magnetic media.

There is a growing demand for increased data density, which has in turn resulted in the need to form magnetic write heads with ever smaller write pole dimensions such as reduced write pole width. This reduction in write pole size results in decreased magnetic write field strength and increased risk of inadvertently writing to adjacent data tracks. In order to provide sufficient write field strength at the tip of the write pole, the write pole can be shaped with a taper so as to concentrate magnetic flux to the tip of the write pole. However, inducing a strong magnetic flux into the write pole tip in this manner can result in some of the write field leaking to the sides. This results in Adjacent Track Interference (ATI), in which a data track is simultaneously deleted by an adjacent track, and also results in Far Track Interference, in which a post recording demagnetization occurs at a position several tracks away. This can be ameliorated by forming the write pole with a bevel angle that narrows the track width of the write pole at its leading edge. However, the reduction write pole area at the media facing surface weakens the magnetic write field. The use of a magnetic shield structure, surrounding the write pole has also been shown to reduce far track interference. However, magnetic flux flowing into the side shields directly from the write pole causes field saturation and domain wall movement which also cause far track interference. Therefore, the remains a need for a write head structure that can provide a sufficiently strong write field for effective data recording, while also preventing far track and adjacent track interference.

SUMMARY

The present invention provides a magnetic write head that includes a magnetic write pole having a first bevel angle and a first flare angle, and a magnetic side shield structure having a second bevel angle and a second flare angle. The magnetic write head further includes a non-magnetic gap structure formed between the magnetic side shield structure and the magnetic write pole. The write head is configured such that the first bevel angle is greater than the second bevel angle and the second flare angle is greater than the first flare angle.

The write head can be formed using a bi-layer side gap structure that includes a first layer of non-magnetic material that has a substantially constant thickness and that is conformal with the write pole. This first layer can be formed adjacent to and in contact with the sides of the write pole. The second layer of the bi-layer side gap structure can be formed independently of the first layer and can have a non-uniform thickness and can be formed to be non-conformal with the write pole. The second layer can be formed to have a thickness that increases with increasing distance from the media facing surface and can be formed with a thickness that increases in the leading direction and decreases in the trailing direction.

This novel write head structure advantageously prevents near and far track interference, while also advantageously preventing the loss of magnetic flux from the write pole directly to the shield. In this way, the write head allows for high magnetic write field, while preventing data loss resulting from adjacent and far track interference.

These and other features and advantages of the invention will be apparent upon reading of the following detailed description of the embodiments taken in conjunction with the figures in which like reference numeral indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION

The following description is of the best embodiments presently contemplated for carrying out this invention. This description is made for the purpose of illustrating the general principles of this invention and is not meant to limit the inventive concepts claimed herein.

Figure 1:
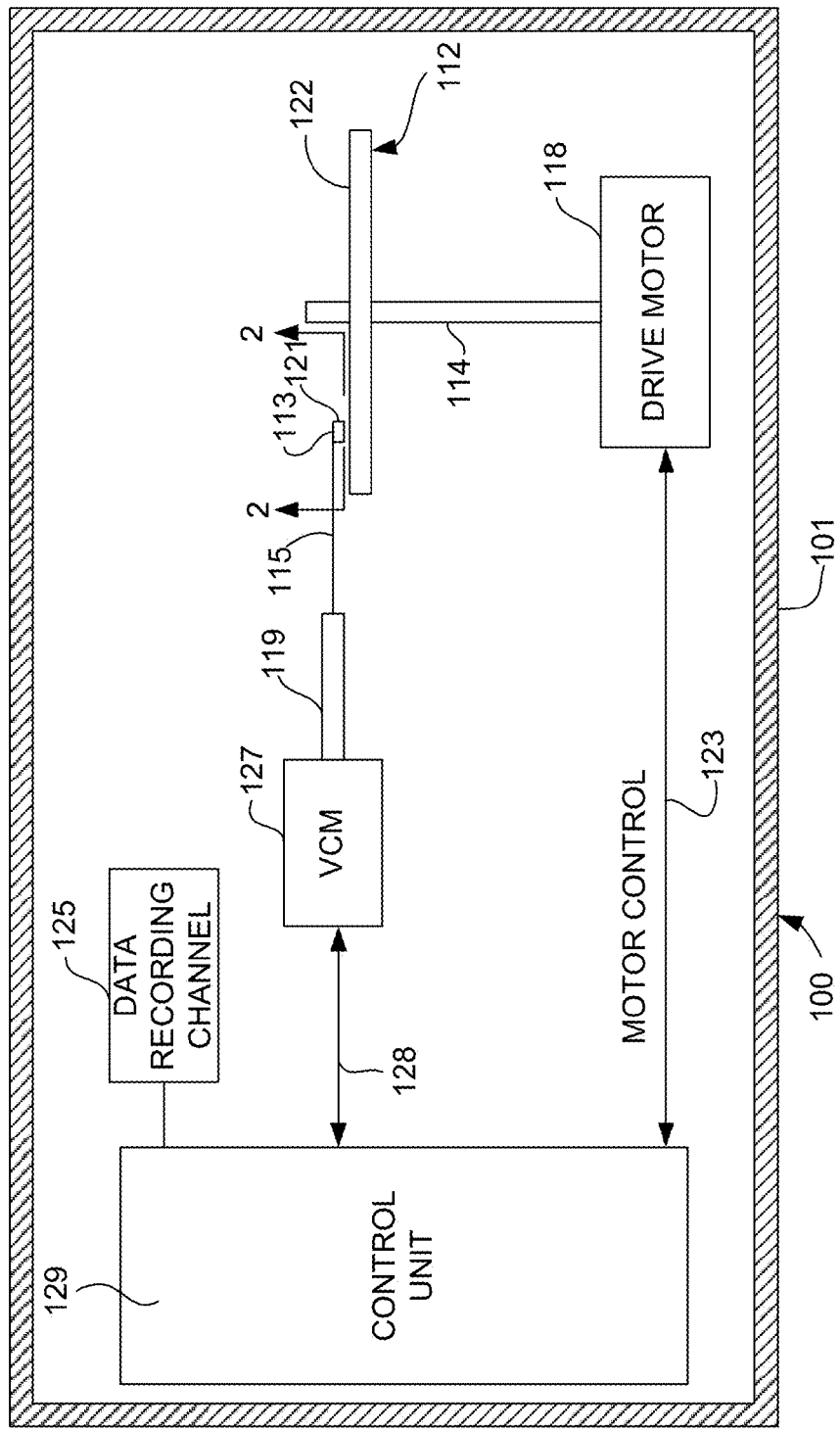
FIG. 1 is a schematic illustration of a disk drive system in which the invention might be embodied.

Referring now to FIG. 1, there is shown a disk drive 100. The disk drive 100 includes a housing 101. At least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases the slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by the controller 129.

During operation of the disk storage system, the rotation of the magnetic disk 112 generates an air bearing between the slider 113 and the disk surface 122, which exerts an upward force or lift on the slider. The air bearing thus counter-balances the slight spring force of the suspension 115 and supports the slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage, means and a microprocessor. The control unit 129 generates control signals to control various system operations such as drive motor control signals on line 123 and head position and seek control signals on line 128. The control signals on line 128 provide the desired current profiles to optimally move and position the slider 113 to the desired data track on the media 112. Write and read signals are communicated to and from write and read heads 121 by way of recording channel 125.

Figure 2:
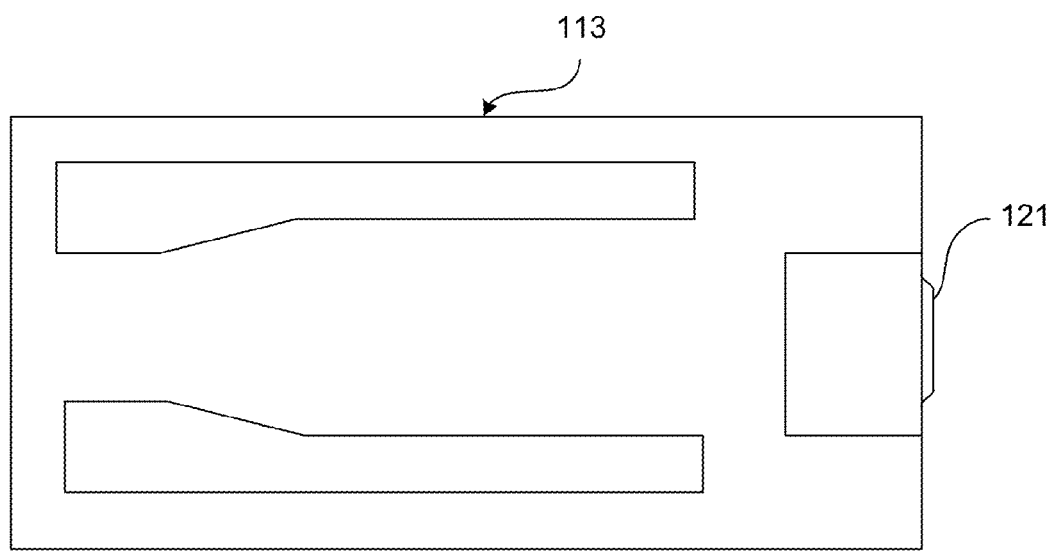
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen, the magnetic head 121, including an inductive write head and a read sensor, is located at a trailing edge of the slider 113. The above description of a typical magnetic disk storage system and the accompanying illustration of FIGS. 1 and 2 are for representation purposes only. It should be apparent that the disk storage system may contain a large number of disks and actuators, and each actuator may support a number of sliders.

Figure 3:
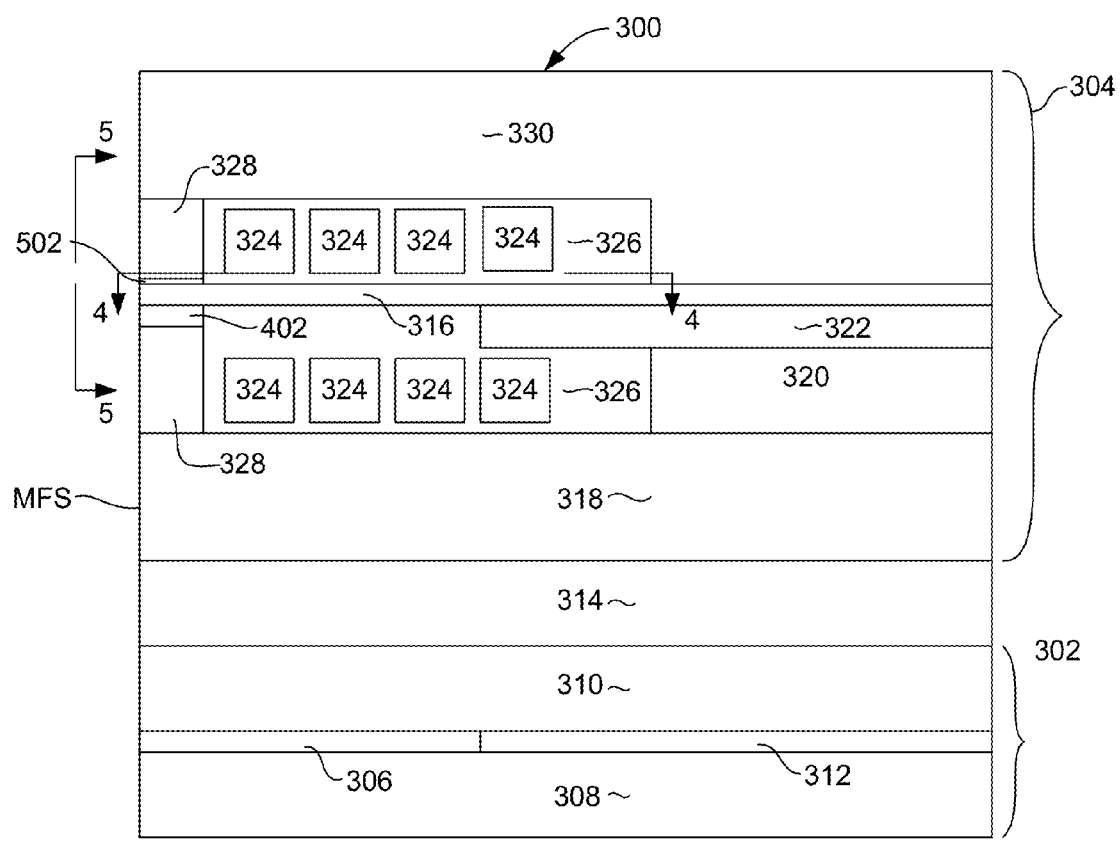
FIG. 3 is a side cross sectional view of a magnetic head for use in a magnetic data recording system.

FIG. 3, shows a side, cross sectional view of a magnetic head 300 such as can be formed on a slider of a magnetic data recording system. The magnetic head 300 includes a magnetic read element 302 and a magnetic write element 304. The magnetic read element 302 can include a magnetoresistive sensor 306 that can be sandwiched between first and second magnetic shields 308, 310 and which can also be embedded in a dielectric fill material 312. The read element 302 can be separated from the magnetic write element 304 by a non-magnetic, electrically insulating layer 314 such as alumina.

The write element 304 includes a magnetic write pole 316 that extends to a media facing surface MFS. If the magnetic head 300 is used in a magnetic disk drive system as described above with reference to FIG. 1, then the media facing surface can be an air bearing surface. However, the magnetic head 300 could also be used in some other type of system. For example, if used in a magnetic tape drive system, the media facing surface MFS could be a tape bearing surface.

The magnetic write element 304 also includes a magnetic return pole 318, that can be magnetically connected with a magnetic back gap structure 320 at a location removed from the media facing surface MFS. Also, a magnetic shaping layer 322 can connect the magnetic back gap layer 320 and magnetic write pole 316 so as to channel magnetic flux to the write pole 316.

With continued reference to FIG. 3, a magnetic write coil 324 is formed near the write pole 316. As shown in FIG. 3, the coil 324 can pass above and below the magnetic write pole 316. The coil 324 can be constructed of an electrically conductive, non-magnetic metal such as Cu and can be embedded in a non-magnetic, electrically insulating fill layer such as alumina 326. Electrical current flowing through the coil 324 causes a magnetic flux to flow through the write coil 316 which emits from the tip of the write pole 316 to write a magnetic bit on an adjacent magnetic media (not shown in FIG. 3). The magnetic flux travels through the magnetic media (not shown in FIG. 3) to return to the return pole 318, through the back gap layer 320 and shaping layer 322 and back to the write pole 316.

With reference still to FIG. 3 a magnetic shield 328 can be provided that wraps around the write pole 316. The configuration of the shield 328 will be described in greater detail herein below. The shield 328 can be connected with a trailing return pole 330 to conduct magnetic flux away from the shield 328, and may also be connected with the leading return pole 318 for this same purpose.

Figure 4:
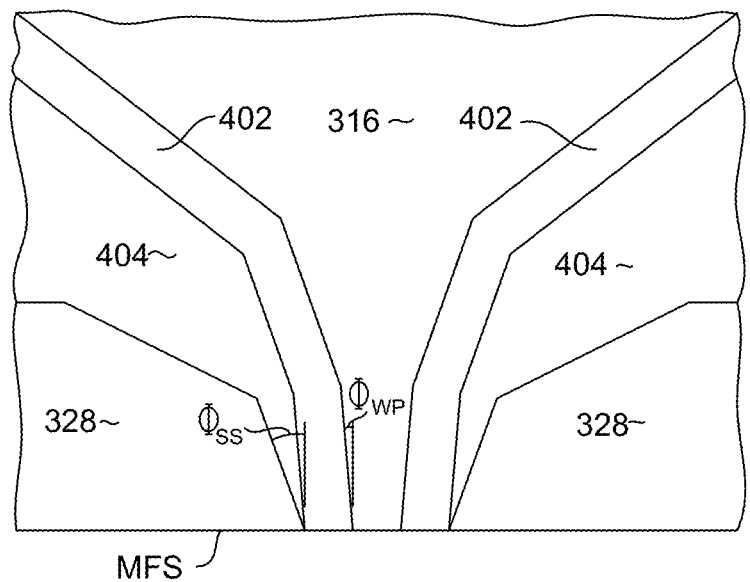
FIG. 4 is a top down view of the magnetic head as seen from line 4-4 of FIG. 3.
Figure 5:
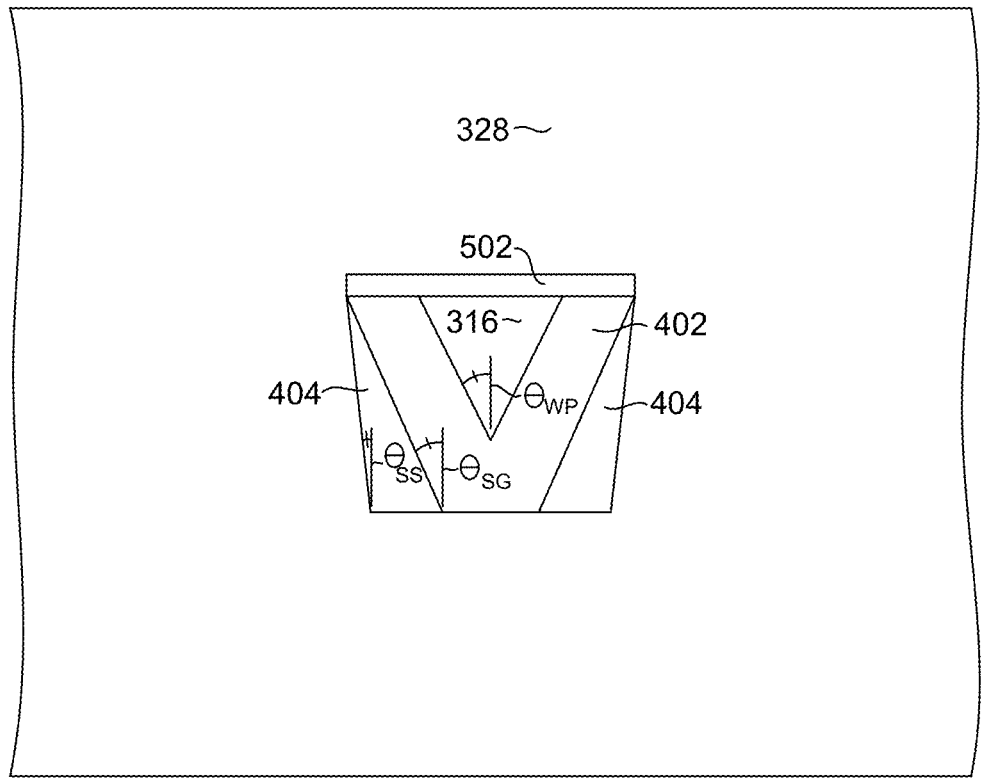
FIG. 5 is an enlarged view of a portion of the magnetic head as seen from line 5-5 of FIG. 3.

FIG. 4 is a top down view of the write pole 316 and shield 328 as seen from line 4-4 of FIG. 3, and FIG. 5 is an enlarged view of the write pole 316 and shield 328 as seen from the media facing surface MFS and as seen from line 5-5 of FIG. 3. A magnetic write pole is traditionally formed with a flare such that the write pole gets narrower as it extends toward the media facing surface. This helps to channel magnetic flux to the tip of the write pole. However, using a magnetic write pole having this structure allows magnetic field to leak from the sides of the main pole causing adjacent track interference and inadvertent data erasure. A side magnetic shield can be used to prevent this, the side shield being separated from the magnetic write pole by a desired distance. However, the tip of the main pole is strongly magnetically excited during data recording. Thus, magnetic flux can flow directly to the side shield from the write pole, which excessively excites the side shield. The magnetic flux can then leak from the shield to the recording medium. This results in far track interference (FTI), in which previously recorded data is deleted even at locations far away from the write pole.

A write head such as shown in FIGS. 4 and 5, however, overcomes these challenges while also maintaining a strong write field for high performance magnetic data recording. FIG. 4 shows the write pole 316 having a flare angle $\Phi_{WP}$ and the side shield 328 having a flare angle $\Phi_{SS}$, both of which are measured relative to an axis that is perpendicular to the media facing surface MFS. As can be seen in FIG. 4, the flare angles $\Phi_{WP}$, $\Phi_{SS}$ of the write pole 316 and side shield 328 differ significantly, with $\Phi_{WP}$ being smaller than $\Phi_{SS}$. As shown in FIG. 4, the total thickness of the side gap (thickness of gap layers 402, 404) increases significantly with increasing distance from the media facing surface MFS. Because of this, the amount of magnetic flux flowing directly from the write pole 316 to the shield 328 can be reduced. This varying gap thickness can be achieved by the use of multiple gap layers 402, 404, as will be seen below. The write pole 316 can have a flare angle $\Phi_{WP}$ of 20-30 degrees or about 25 degrees in a region at or near the media facing surface (MFS). The side shield 328, on the other hand, can have a flare angle $\Phi_{SS}$ of 30 to 40 degrees or about 35 degrees in a region at or near the media facing surface (MFS). The difference between the flare angles $\Phi_{WP}$, $\Phi_{SS}$ of the write pole 316 and side shield 328 can become even more pronounced further away from the media facing surface (MFS) as seen in FIG. 4. For example, in a region removed from the media facing surface (MFS) the write pole 316 can have a flare angle $\Phi_{WP}$ of 30-40 degrees or about 35 degrees and the side shield 328 can have a flare angle $\Phi_{SS}$ of 65-75 degrees or about 70 degrees.

FIG. 5 shows an enlarged view of the media facing surface of a portion of the write element 300 as seen from line 5-5 of FIG. 3. As shown in FIG. 5, the magnetic write pole 316 can have a triangular shape as viewed from the media facing surface. Alternatively, the write pole 316 can have a trapezoidal shape. The write pole 316 preferably has a constant bevel angle $\theta_{WP}$, which is the angle of the sides of the write pole 316 with respect to an axis that is parallel with the data track direction. This shape suppresses adjacent track interference (ATI) which would otherwise occur as a result of skew at the inner and outer regions of the media. However, if the bevel angle is too large, the available cross sectional area of the write pole 316 is reduced which decreases the available magnetic write field strength. A magnetic write element 300 as described herein can suppress this reduction in magnetic field strength by applying the desired bevel angle $\theta_{WP}$ to the write pole 316 while reducing the bevel angle $\theta_{SS}$ of the sides of the shield 328. As can be seen in FIG. 5, the total side gap is formed as a multi-layer structure that includes an inner non-magnetic layer 402, and an outer non-magnetic layer 404. The inner layer 402 can be substantially conformal with the write pole so that it forms a bevel angle $\theta_{SG}$ that is substantially the same as the bevel angle $\theta_{WP}$ of the write pole 316. The outer layer 404, however can be non-conformal so that it has an outer edge that defines the side shield bevel angle $\theta_{SS}$. In one exemplary embodiment, the write pole 316 can have a bevel angle $\theta_{WP}$ of 15-25 degrees or about 20 degrees, whereas the side shield 328 can have a bevel angle $\theta_{SS}$ of only 5-15 or about 10 degrees.

Figure 19:
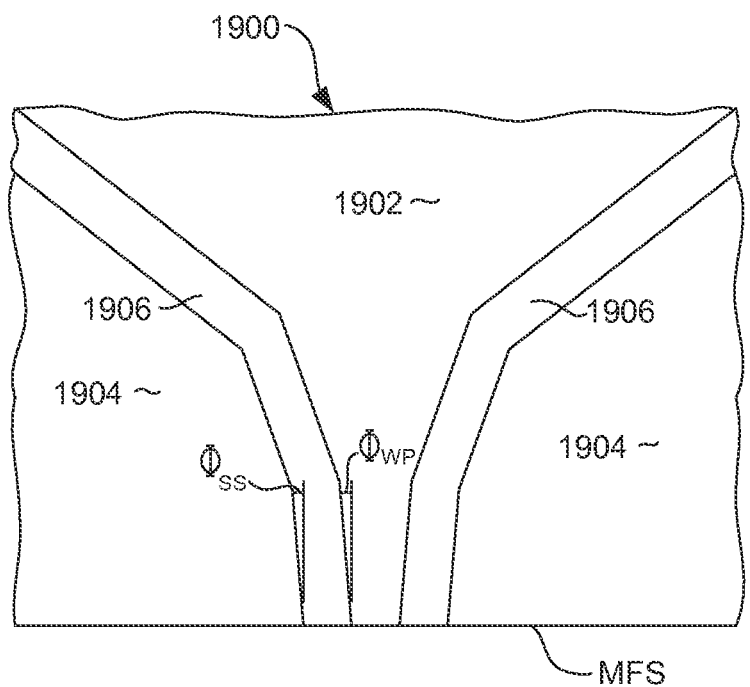
FIG. 19 is a finite element model of a magnetic head having a conformal side gap.

The effect of this novel construction can be seen using a magnetic field simulation obtained by using finite element method (FEM) magnetic field calculations. FIG. 19 shows a calculation model 1900 for a structure having a constant write pole side shield gap spacing. The model 1900 includes a write pole 1902 and a shield 1904 surrounding the write pole 1902, the side shield 1904 being separated from the write pole 1902 by a non-magnetic side gap 1906 that has a substantially constant thickness. The bevel angle (not shown in FIG. 19) of both the write pole 1902 and side shield 1904 is 15 degrees. That is, the write pole 1902 and side shield 1904 have the same bevel angle. The flare angel $\Phi_{WP}$ of the write pole 1902 and flare angle $\Phi_{SS}$ of the side shield 1904 are also equal to one another. The flare angles $\Phi_{WP}$ and $\Phi_{SS}$ can be 25 degrees in the range from the media facing surface MFS to 100 nm, 35 degrees in the range from 100 to 200 nm, and 45 degrees beyond 300 nm (all as measured from the media facing surface (MFS).

A calculation model 2000 for a structure having non-uniform, non-conformal flare and bevel angles is described with reference to FIG. 20. The model 2000 includes a write pole 2002, side shield structure 2004 and a non-uniform, non-conformal, multi-layer, non-magnetic side gap 2006 that includes a conformal portion 2006a and a non-conformal portion 2006b. The bevel angle (not shown in FIG. 20) of the write pole 2002 is 20 degrees and the bevel angle of the side shield 2004 (also not shown in FIG. 20) is 10 degrees. The flare angle $\Phi_{SGa}$ of the side gap 2006a in contact with the write pole 2002 is equal to the flare angle $\Phi_{WP}$ of the write pole 2002, but the flare angle $\Phi_{SGb}$ of the side shield 2006b is greater than that of the write pole 2002 (e.g. greater than $\Phi_{WP}$). For the write pole 2002, the flare angle $\Phi_{WP}$ can be 25 degrees in the range from the media facing surface MFS to 100 nm, 35 degrees in the range from 100 to 200 nm, and 45 degrees beyond 300 nm (all as measured from the media facing surface (MFS). However, for the side shield, the flare angel $\Phi_{SS}$ 35 degrees in the range from the media facing surface MFS to 100 nm, and 70 degrees in the range from 100 to 200 nm. degrees beyond 300 nm (all as measured from the media facing surface (MFS).

Figure 20:
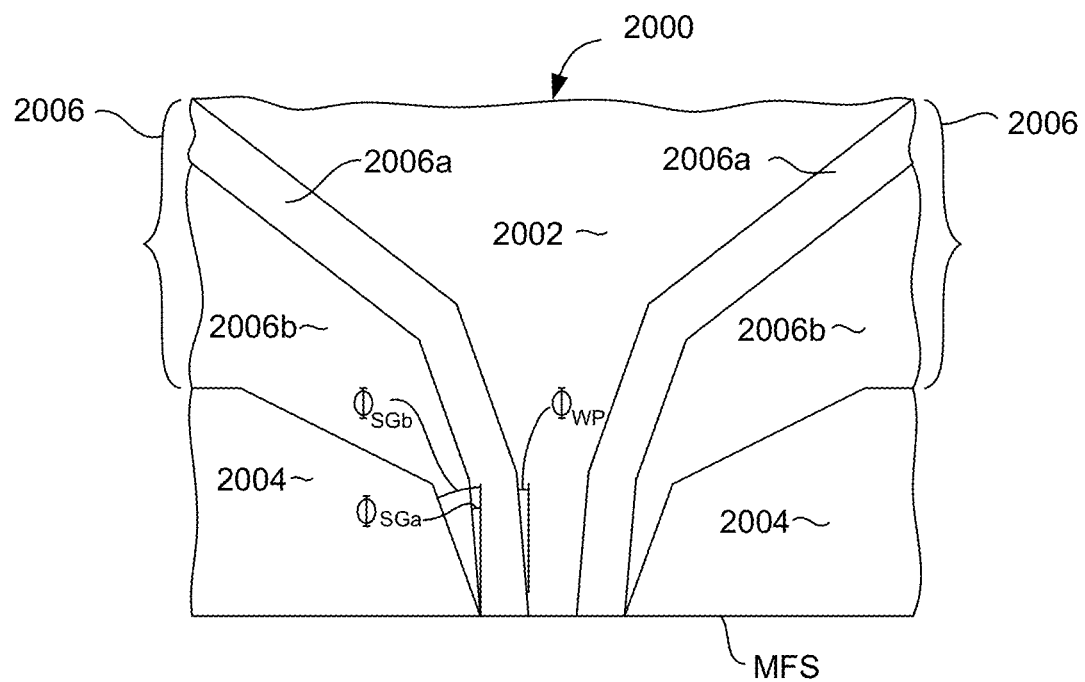
FIG. 20 is a finite element model of a magnetic head having a non-conformal side gap with non-conformal write pole and shield bevel and flare angles.
Figure 21:
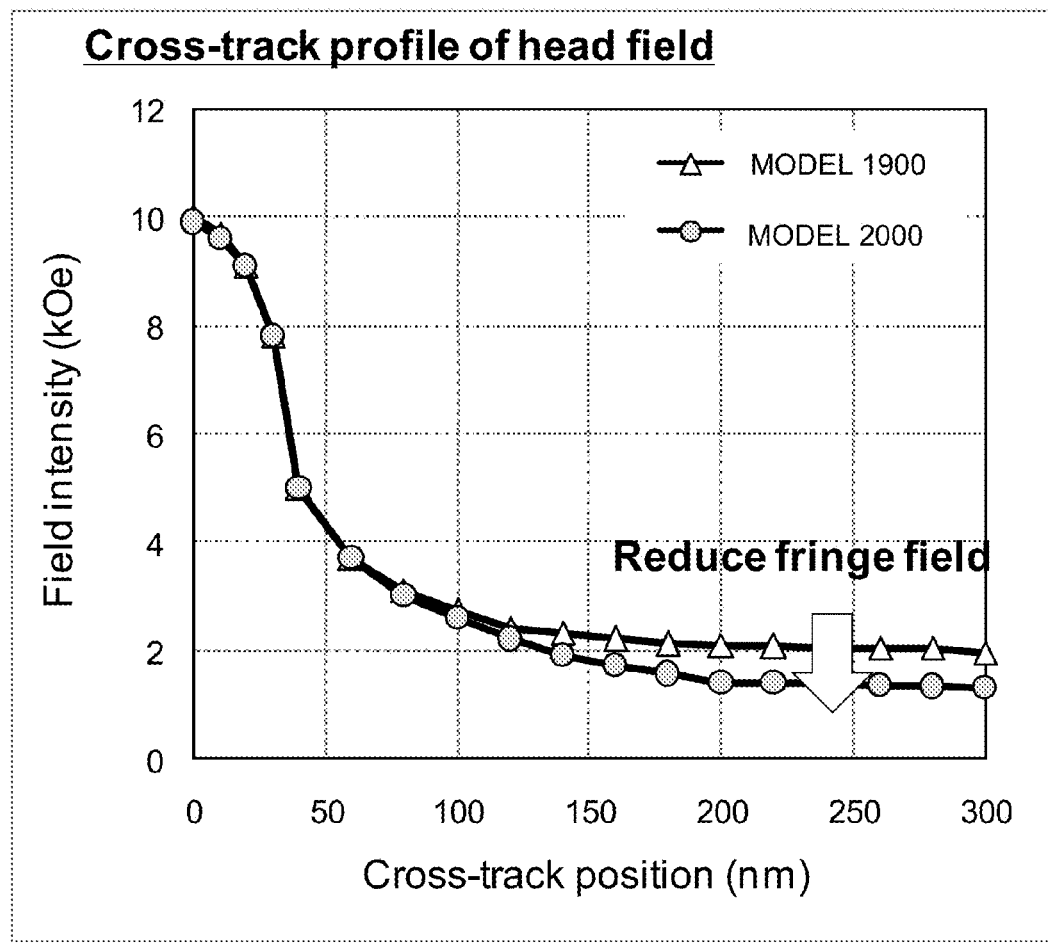
FIG. 21 is a graph showing a relationship between magnetic write field intensity and cross track position for the models of FIGS. 19 and 20.

FIG. 21 shows the cross-track profiles of the magnetic field distributions obtained from FEM calculations for the models 1900 and 2000 of FIGS. 19 and 20 respectively. The magnetic field strength in the track central portion is nearly equal for both models 1900, 2000. However, in the region 100 nm or more from the write pole 2002, the magnetic field declines approximately 0.4 kOe more for the structure of the model 2000 than it does for the model 1900. This means that the magnetic field leaking into the surrounding tracks has been reduced, and FTI can be reduced for the non-conformal configuration of model 2000 while maintaining the recording magnetic field strength. The structure described with reference to FIG. 20 (as well as that described above with reference to FIGS. 3-5) effectively reduces the ATI as well.

Figure 22:
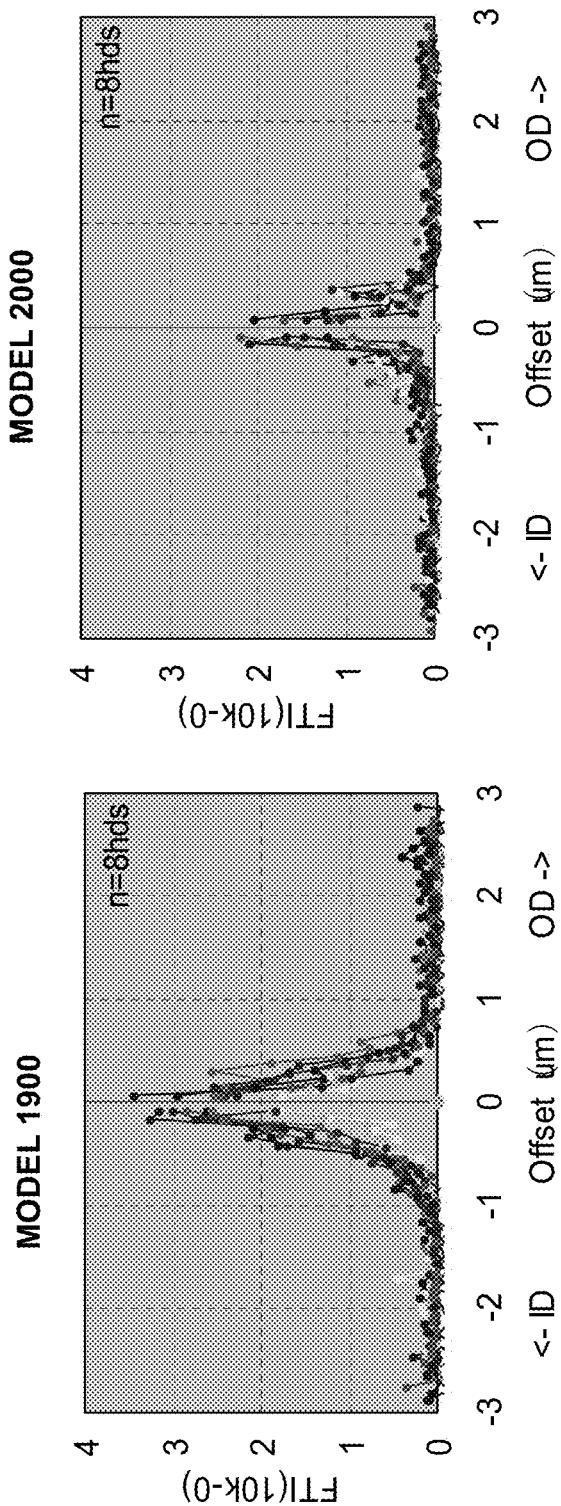
FIG. 22 shows plots of magnetic field distribution for the models of FIGS. 19 and 20.

FIG. 22 shows the distribution of the recording magnetic field applied to the recording medium in the calculation models 1900, 2000 shown in FIGS. 19 and 20 respectively. When a skew angle is present, the magnetic field distribution widens on the leading edge in the cross-track direction. However, because the bevel angle can be increased in the structure of model 2000 while also maintaining the magnetic field strength, skew related widening of the magnetic field distribution towards the adjacent track can be suppressed. In addition, it has been found that the model 2000 reduces skew related leakage of magnetic write field.

Figure 6:
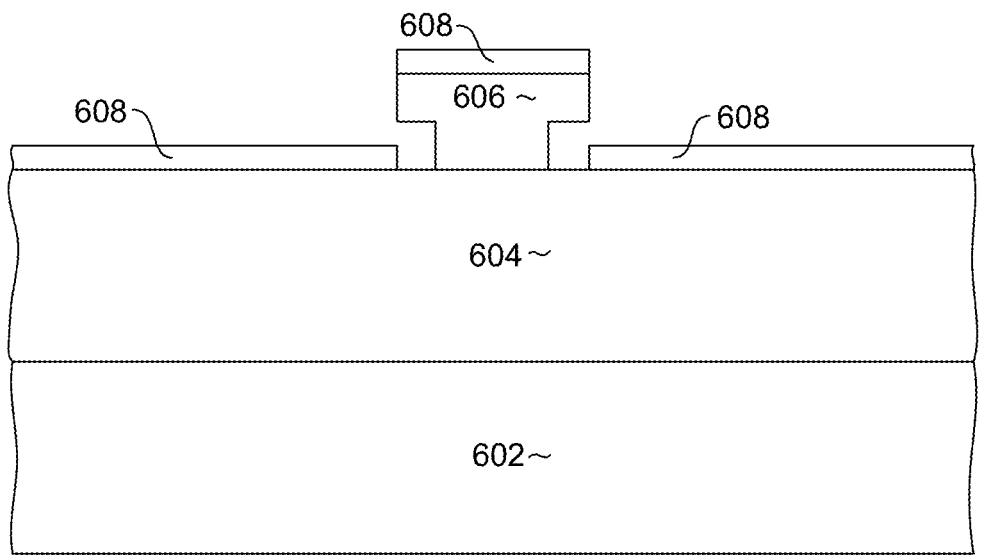
FIGS. 6-18 are views of a portion of a magnetic write head in various intermediate stages of manufacture, illustrating a method for manufacturing a magnetic write head.
Figure 7:
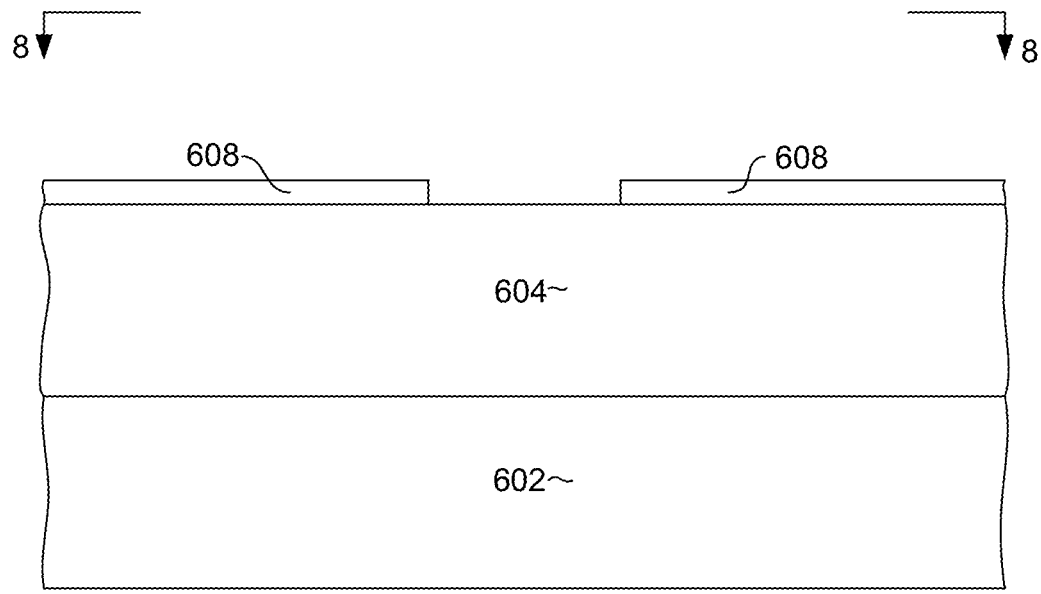
Figure 8:
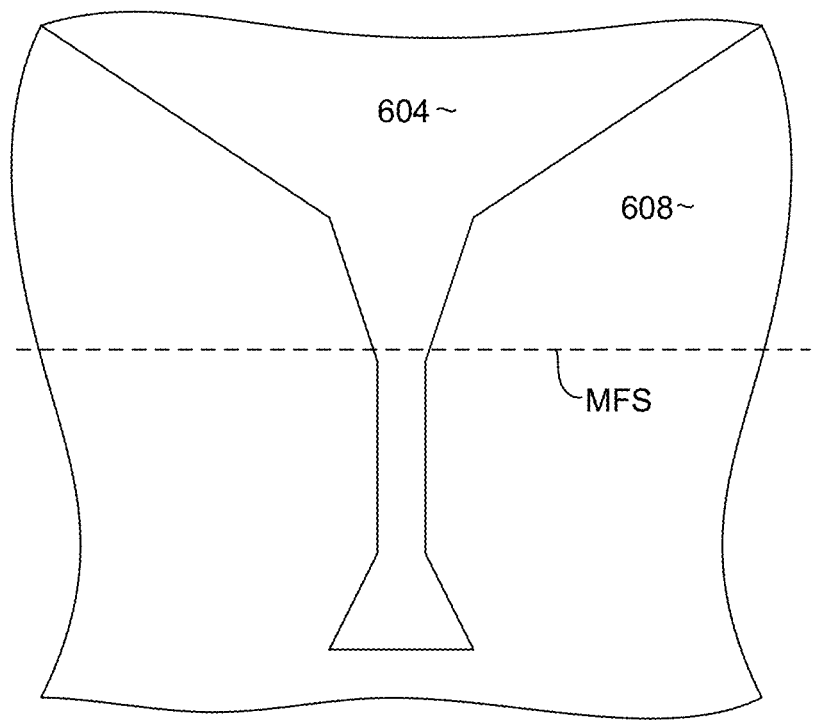

FIGS. 6-18 show a portion of a magnetic write element in various intermediate stages of manufacture in order to illustrate a method of manufacturing a magnetic write element having a tapered, non-conformal side gap. With particular reference to FIG. 6, a substrate 602 is formed. The substrate 602 can have a planar surface and can include portions of the shield 328, non-magnetic fill layer 326, and shaping layer 322 described above with reference to FIG. 3. A magnetic side shield material 604 is deposited over the substrate 602. The magnetic side shield material 604 can be deposited by electroplating or sputtering, for example. A photoresist mask 606 is formed over the magnetic side shield material layer 604, the photoresist mask 606 having a configuration to define a flare angle $\Phi_{SS}$ of the side shield. The photoresist mask 606 is preferably formed as a bi-layer mask having an overhang as shown in FIG. 6. Then, a hard mask material 608 is deposited over the photoresist mask 606 and magnetic side shield material layer 604. The photoresist mask 606 is then lifted off, leaving a structure as shown in FIG. 7 with an opening in the hard mask 608. FIG. 8 shows a top down view of the structure of FIG. 7 as seen from line 8-8 of FIG. 7. The location of a media facing surface plane is indicated by the dashed line denoted as MFS.

Figure 9:
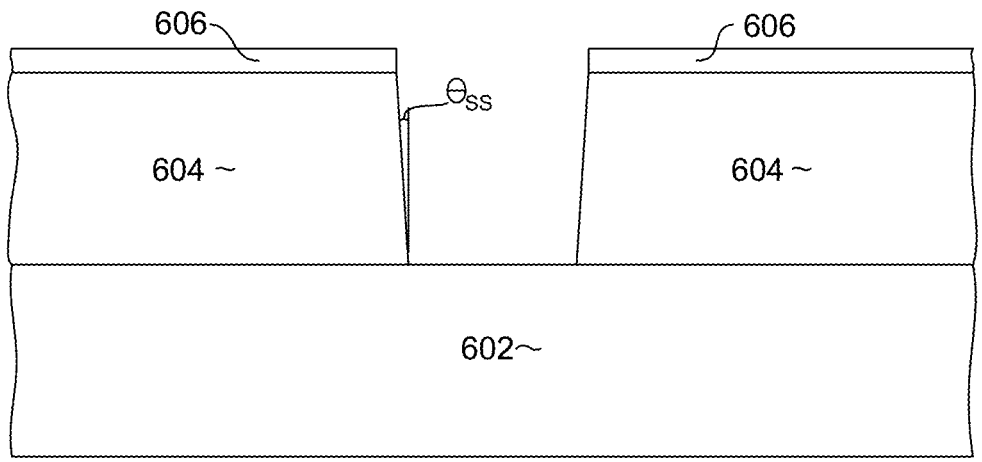

Then, with reference to FIG. 9, a reactive ion etching is performed to remove portions of the magnetic shield material 604 that are not protected by the hard mask 606. The reactive ion etching is performed in such a manner as to form a trench in the magnetic shield material layer 604 that has tapered side walls that define a side shield bevel angle $\theta_{SS}$. The side shield bevel angle $\theta_{SS}$ can be controlled by proper selection etching gas type, etching gas pressure and the application bias. A first non-magnetic side gap material 1002 (FIG. 10) is then deposited into the trench, and a chemical mechanical polishing process can then be performed to remove portions of the first non-magnetic gap material 1002 that are outside of the trench. The first non-magnetic gap material 1002 can be a material such as $Al_2O_3$, $SiO_2$ or NiCr and can be deposited by electroplating or sputtering. The hard mask 606 can then be removed, leaving a structure as shown in FIG. 10.

Figure 10:
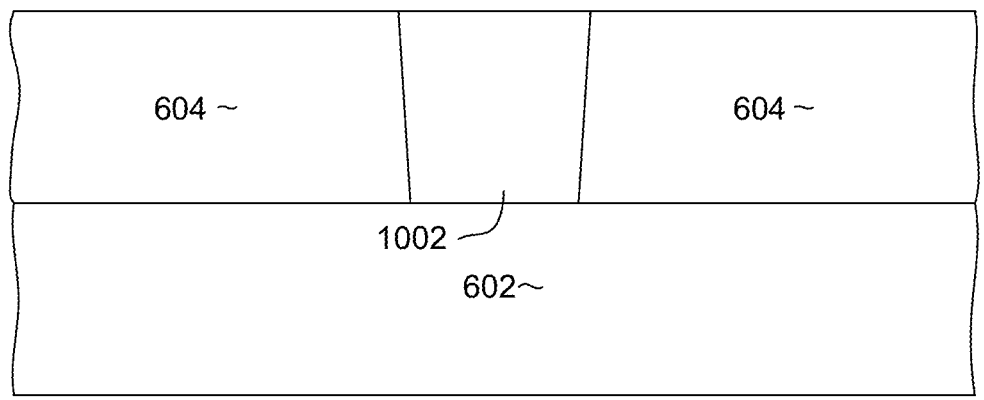
Figure 11:
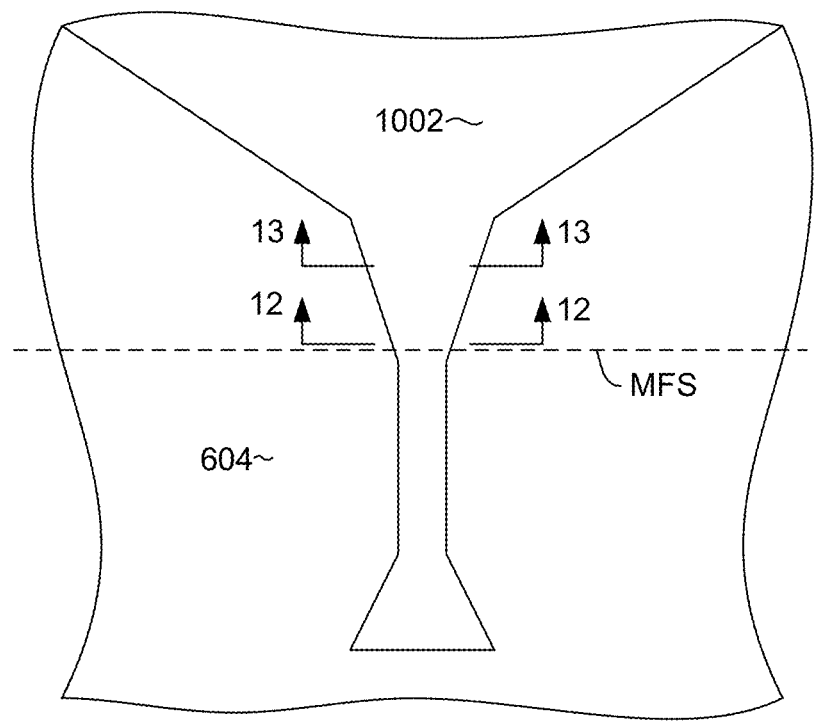
Figure 12:
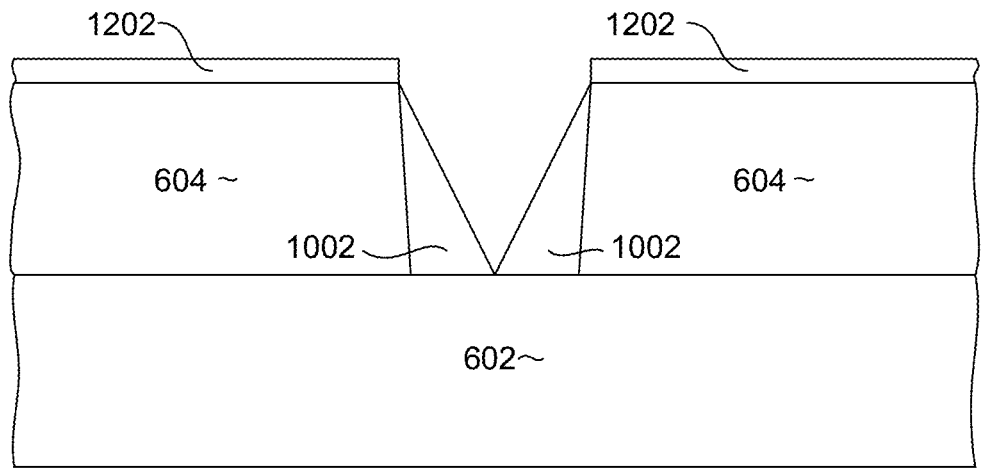
Figure 13:
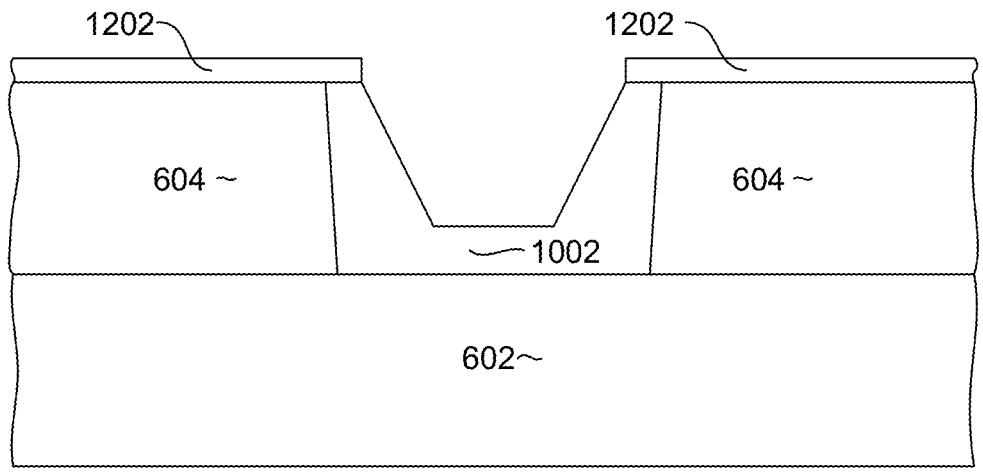
Figure 14:
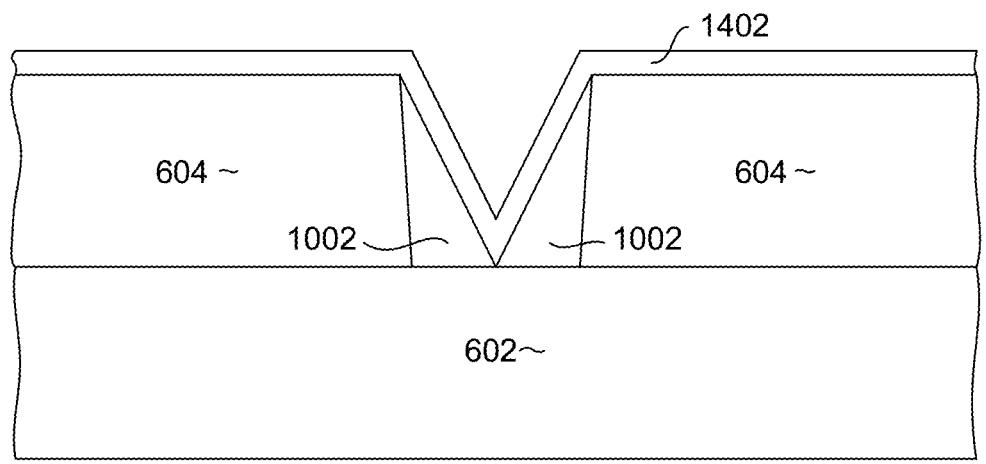
Figure 15:
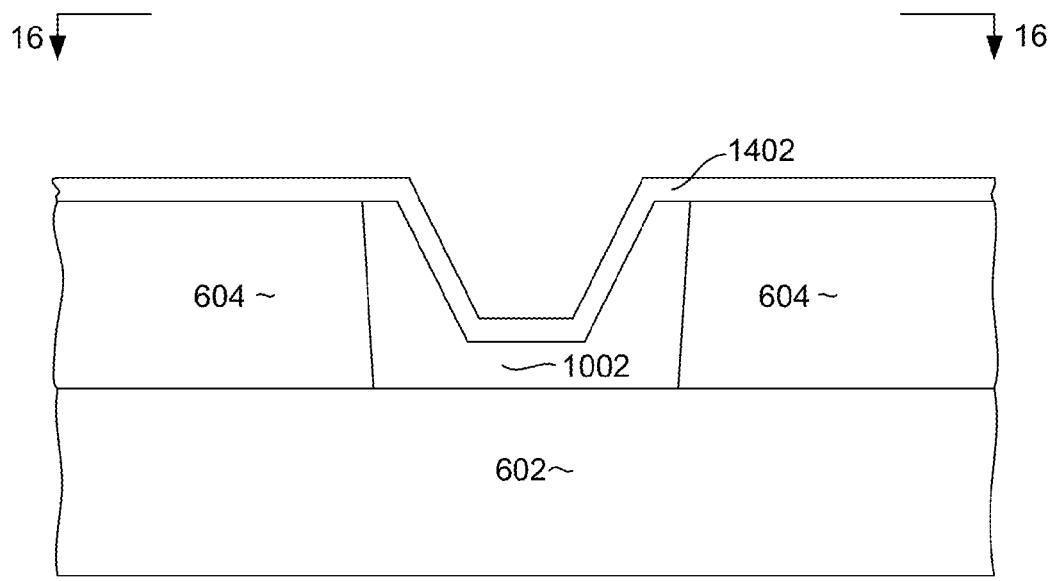

FIG. 11 shows a top down view as seen from line 11-11 of FIG. 10. FIGS. 12 and 13 are cross sectional views as seen from lines 12-12 and 13-13 respectively. As can be seen, FIG. 12 is a cross section taken at a location at or near the media facing surface plane (MFS), whereas FIG. 13 is a cross section taken at a location in the flared region of the write pole 1002. With reference to FIGS. 12 and 13, a second hard mask is formed over the fill layer 604 and first non-magnetic gap material 1002. This hard mask 1202 can be formed by a photoresist liftoff process similar that described above with reference to FIGS. 6 and 7. The second mask 1202 is formed with an opening that is configured to define a magnetic write pole shape. Because the flare angle of the write pole and side gap $\Phi_{SG}$ can be controlled independently of the side shield flare angle $\Phi_{SS}$, the angels can be set so that the write pole flare angle $\Phi_{SG}$ is smaller than the flare angle of the side shield $\Phi_{SS}$. In FIGS. 12 and 13, it can be seen that the second mask 1202 has an opening with a width that is similar that is similar to width of the non-magnetic gap material (e.g. similar to the opening in the first mask 606 (FIG. 9)) in the region of the media facing surface plane (e.g. FIG. 12). However, the second mask 1202 becomes narrower with increasing distance from the media facing surface plane, so that in FIG. 13, the side gap material forms a thicker side wall than in FIG. 12. FIGS. 14 and 15 show cross sections at the same locations as FIGS. 12 and 13, with FIG. 14 being at the same location as FIG. 12 and FIG. 15 being at the same location as FIG. 13. A reactive ion etching or an ion milling can be used to remove portions of the first non-magnetic side gap material 1002 that are not protected by the mask 1202. As in the case of the of the side shield flare angle discussed above, the etching conditions can be controlled independently of the previous etching process that was used to define the side shield bevel angle. Therefore, the bevel angle of the side gap and write pole can be made greater than the side shield bevel angle. After this second etching process the second mask 1202 can be removed.

With reference to FIGS. 14 and 15, a second layer of non-magnetic, electrically insulating side wall material 1402 is deposited. The second layer of non-magnetic, electrically insulating side wall material 1402 can be a non-magnetic oxide such as $Al_2O_3$, $SiO_2$ or NiCr. This layer 1402 can be a substantially conformal layer having the same thickness at location of FIG. 14 as it does at the location of FIG. 15.

Figure 16:
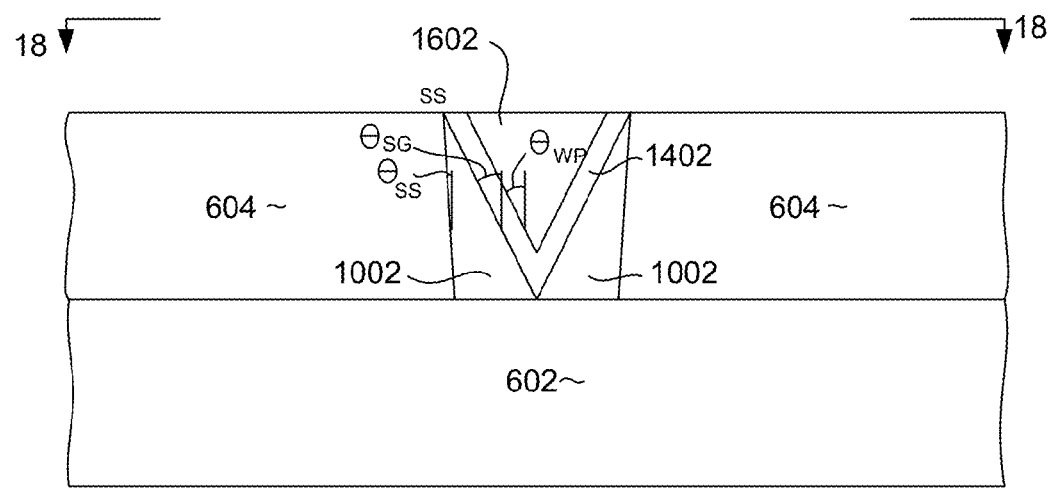
Figure 17:
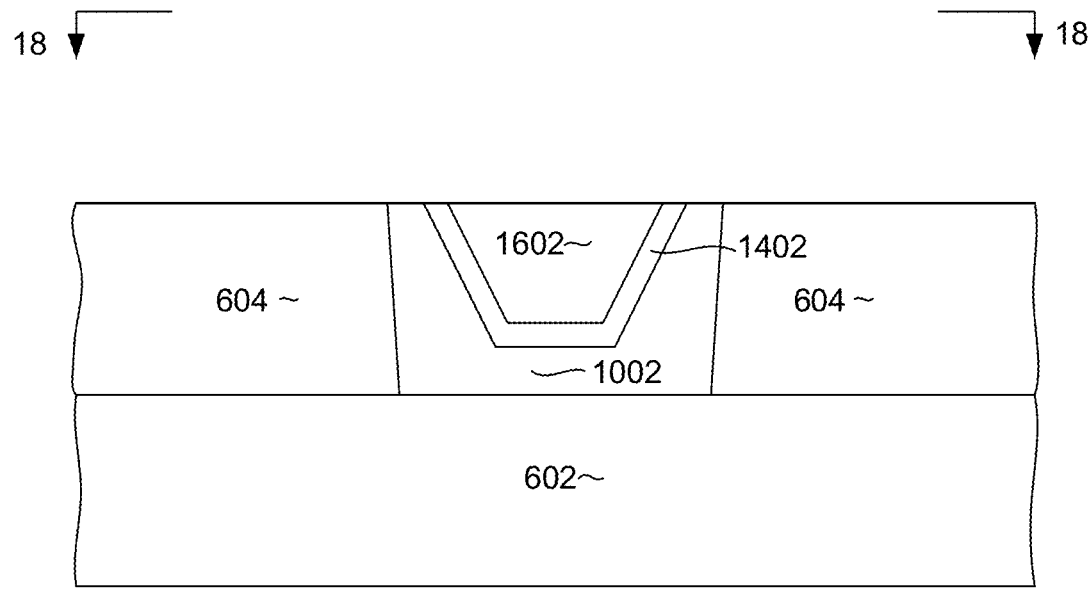
Figure 18:
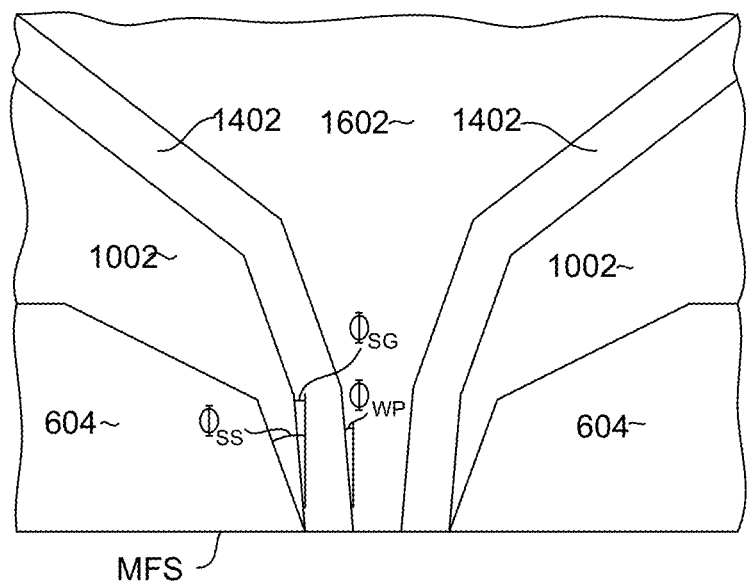

Then, with reference to FIGS. 16 and 17, a magnetic write pole material 1602 is deposited by a process such as electroplating, and a planarization process such as chemical mechanical polishing is performed. This leaves a structure as shown in FIGS. 16 and 17, where FIG. 16 is at the same location as FIG. 14 and FIG. 17 is at the same location as FIG. 15. FIG. 18 shows a top down view of the structure of FIGS. 16 and 17. By forming the second side gap film 1402 in a conformal manner having a substantially uniform thickness, the bevel angle $\theta_{WP}$ and flare angle $\Phi_{WP}$ of the magnetic write pole 1602 are equal to the bevel angle $\theta_{SG}$ and flare angle $\Phi_{SG}$ of the side gap. As a result, a structure can be formed wherein the side shield flare angle $\Phi_{SS}$ is greater than the side gap flare angle $\Phi_{SG}$ and write pole flare angle $\Phi_{WP}$, and the side gap flare angle $\Phi_{SG}$ and write pole flare angle $\Phi_{WP}$ are equal to one another. Also, a structure can be formed wherein side shield bevel angle $\theta_{SS}$ is less than the side gap bevel angle $\theta_{SG}$ and write pole bevel angle $\theta_{WP}$, and the side gap bevel angle $\theta_{SG}$ is equal to the write pole bevel angle $\theta_{WP}$. After the structures have been formed as described above a chemical mechanical polishing can be performed to planarize the upper surface of the structures.

While various embodiments have been described above, it should be understood that they have been presented by way of example only and not limitation. Other embodiments falling within the scope of the invention may also become apparent to those skilled in the art. Thus, the breadth and scope of the invention may also become apparent to those skilled in the art. Thus, the breadth and scope of the inventions should not be limited by any of the above-described exemplary embodiments, but should be defined only in accordance with the following claims and their equivalents.

What is claimed is:

1. A magnetic write head, comprising:
   a magnetic write pole having a first bevel angle and a first flare angle;
   a magnetic side shield structure having a second bevel angle and a second flare angle; and
   a non-magnetic gap structure formed between the magnetic side shield structure and the magnetic write pole;
   wherein the first bevel angle is greater than the second bevel angle and the second flare angle is greater than the first flare angle; and
   wherein the write head has a first region located near a media facing surface and a second region that is recessed from the media facing surface and wherein the flare angle of the write pole is 20-30 degrees in the first region and 30-40 degrees in the second region and the flare angle of the side shield is 30-40 degrees in the first region and 65-75 degrees in the second region.

2. The magnetic write head as in claim 1, wherein the non-magnetic gap structure is a bi-layer structure.

3. The magnetic write head as in claim 1, wherein the non-magnetic gap structure is a bi-layer structure including a first layer having a substantially uniform thickness and being substantially conformal to the write pole and a second layer having a non-uniform thickness and being substantially non-conformal with the write pole.

4. The magnetic write head as in claim 1, wherein the write pole extends to a media facing surface and has a leading edge and a trailing edge, and wherein the non-magnetic gap structure has a thickness that increases with increasing distance from the air bearing surface.

5. The magnetic write head as in claim 1, wherein the write pole extends to a media facing surface and has a leading edge and a trailing edge, and wherein the non-magnetic gap structure is thicker toward the leading edge than it is toward the trailing edge.

6. The magnetic write head as in claim 1, wherein the write pole extends to a media facing surface and has a leading edge and a trailing edge, and wherein the non-magnetic gap structure has a thickness that increases linearly from the trailing edge to the leading edge.

7. The magnetic write head as in claim 1, wherein the write pole extends to a media facing surface and has a leading edge and a trailing edge, and wherein the non-magnetic gap structure has a thickness that increases with increasing distance from the air bearing surface, and has a thickness that is larger adjacent to the leading edge than it is adjacent to the trailing edge.

8. The magnetic write head as in claim 1, wherein the write pole extends to a media facing surface and has an axis that defines a data track direction and wherein the first and second flare angles are measured relative to an axis that is perpendicular to the media facing surface and the bevel angle is measured relative to the axis that defines the data track direction.

9. The magnetic write head as in claim 8 wherein the first flare angle is 20-30 degrees and the second flare angle is 30-40 degrees.

10. The magnetic write head as in claim 8 wherein the first flare angle is about 25 degrees and the second flare angle is about 35 degrees.

11. The magnetic write head as in claim 8 wherein the first bevel angle is 15-25 degrees and the second bevel angle is 5-15 degrees.

12. The magnetic write head as in claim 8 wherein the first bevel angle is about 20 degrees and the second bevel angle is about 10 degrees.

13. A magnetic write head, comprising:
a magnetic write pole having a first bevel angle and a first flare angle;
a magnetic side shield structure having a second bevel angle and a second flare angle; and
a non-magnetic gap structure formed between the magnetic side shield structure and the magnetic write pole;
wherein the first bevel angle is greater than the second bevel angle and the second flare angle is greater than the first flare angle; and
wherein the write head has a first region located near a media facing surface and a second region that is recessed from the media facing surface and wherein the flare angle of the write pole is about 25 degrees in the first region and about 35 degrees in the second region and the flare angle of the side shield is about 35 degrees in the first region and about 70 degrees in the second region.

14. A magnetic data recording system, comprising:
a housing;
a magnetic media having a surface and movably held within the housing; and
a slider mounted within the housing for movement relative to the surface of the magnetic media, the slider having a magnetic write head formed thereon, the magnetic write head further comprising:
a magnetic write pole having a first bevel angle and a first flare angle;
a magnetic side shield structure having a second bevel angle and a second flare angle; and
a non-magnetic gap structure formed between the magnetic side shield structure and the magnetic write pole;
wherein the first bevel angle is greater than the second bevel angle and the second flare angle is greater than the first flare angle; and
wherein the write head has a first region located near a media facing surface and a second region that is recessed from the media facing surface and wherein the flare angle of the write pole is 20-30 degrees in the first region and 30-40 degrees in the second region and the flare angle of the side shield is 30-40 degrees in the first region and 65-75 degrees in the second region.

15. The magnetic data recording system as in claim 14, wherein the non-magnetic gap structure is a bi-layer structure.

16. The magnetic data recording system as in claim 14, wherein the non-magnetic gap structure is a bi-layer structure including a first layer having a substantially uniform thickness and being substantially conformal to the write pole and a second layer having a non-uniform thickness and being substantially non-conformal with the write pole.

17. The magnetic data recording system as in claim 14, wherein the write pole extends to a media facing surface and has a leading edge and a trailing edge, and wherein the non-magnetic gap structure has a thickness that increases with increasing distance from the air bearing surface.

18. The magnetic data recording system as in claim 14, wherein the write pole extends to a media facing surface and has a leading edge and a trailing edge, and wherein the non-magnetic gap structure is thicker toward the leading edge than it is toward the trailing edge.

* * * * *